(12) United States Patent
Minowa et al.

(10) Patent No.: US 6,243,637 B1
(45) Date of Patent: Jun. 5, 2001

(54) CONTROL APPARATUS AND METHOD FOR AUTOMATIC TRANSMISSION BY OIL PRESSURE ON CLUTCH

(75) Inventors: Toshimichi Minowa, Mito; Tatsuya Ochi; Hiroshi Kuroiwa, both of Hitachi; Mitsuyoshi Okada, Hitachinaka; Junichi Noda, Ibaraki-ken, all of (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/271,334

(22) Filed: Mar. 18, 1999

(30) Foreign Application Priority Data

Mar. 19, 1998 (JP) .................................. 10-069779

(51) Int. Cl.[7] ........................................................ G06F 7/00
(52) U.S. Cl. .................................. 701/51; 701/56; 477/31; 477/34
(58) Field of Search .................................. 701/51, 52, 53, 701/54, 55, 56, 57; 477/7, 8, 15, 30, 31, 34, 39, 70, 77, 115, 166; 474/70

(56) References Cited

U.S. PATENT DOCUMENTS

| 4,627,312 | 12/1986 | Fujieda et al. | 477/124 |
| 4,711,333 | * 12/1987 | Okamura | 477/176 |
| 4,922,424 | 5/1990 | Hiramatsu | 701/53 |
| 5,573,476 | 11/1996 | Minowa et al. | 477/109 |

* cited by examiner

Primary Examiner—William A. Cuchlinski, Jr.
Assistant Examiner—Yonel Beaulieu
(74) Attorney, Agent, or Firm—Evenson, McKeown, Edwards & Lenahan, P.L.L.C.

(57) ABSTRACT

A control apparatus of automatic transmission controls by oil pressure at least one clutch of an automatic transmission connected to an engine output to be engaged or disengaged to make gear shifting. In this control apparatus, the output torque of the engine is calculated on the basis of a parameter representative of a load of the engine and the engine speed. In addition, a transfer torque necessary for the clutch is calculated by use of at least the calculated engine output torque and the engine speed. Then, a command value of oil pressure acted on the clutch is determined by the calculated transfer torque.

16 Claims, 12 Drawing Sheets

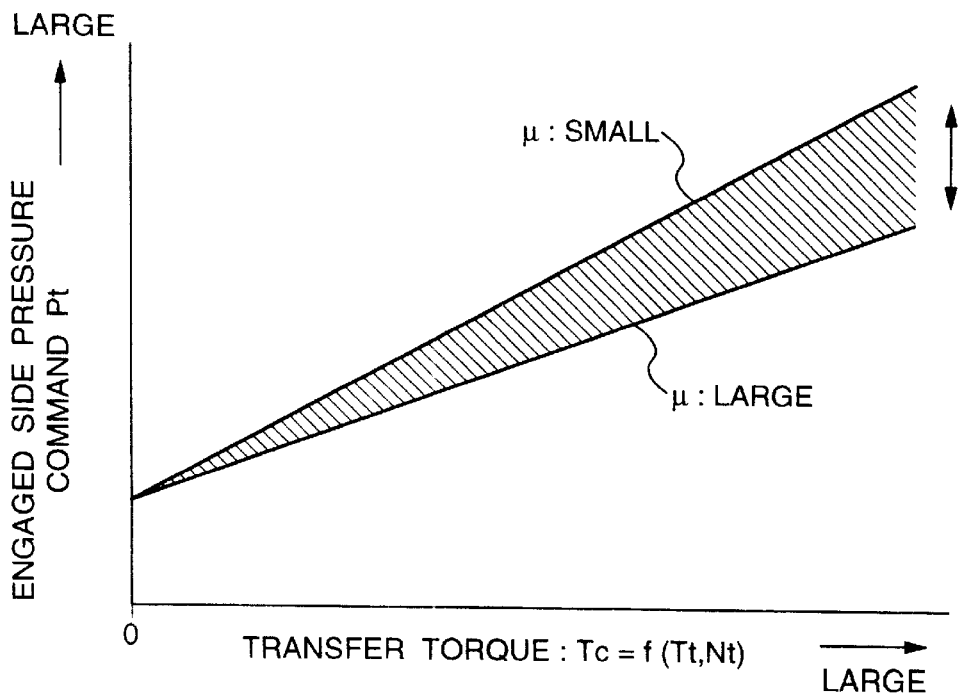
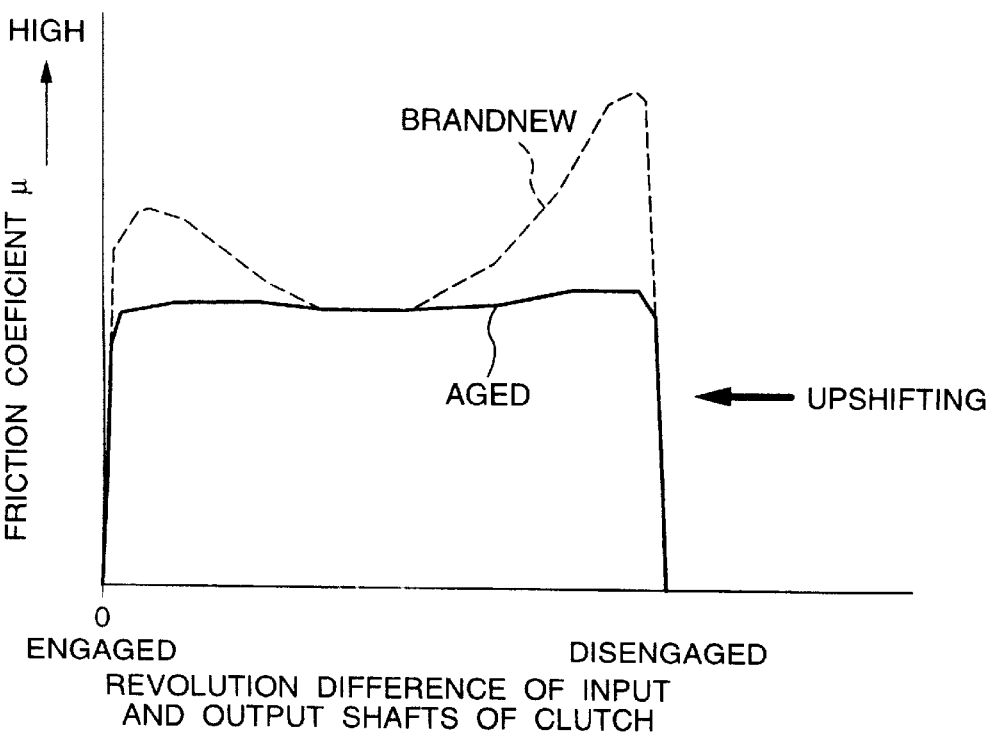

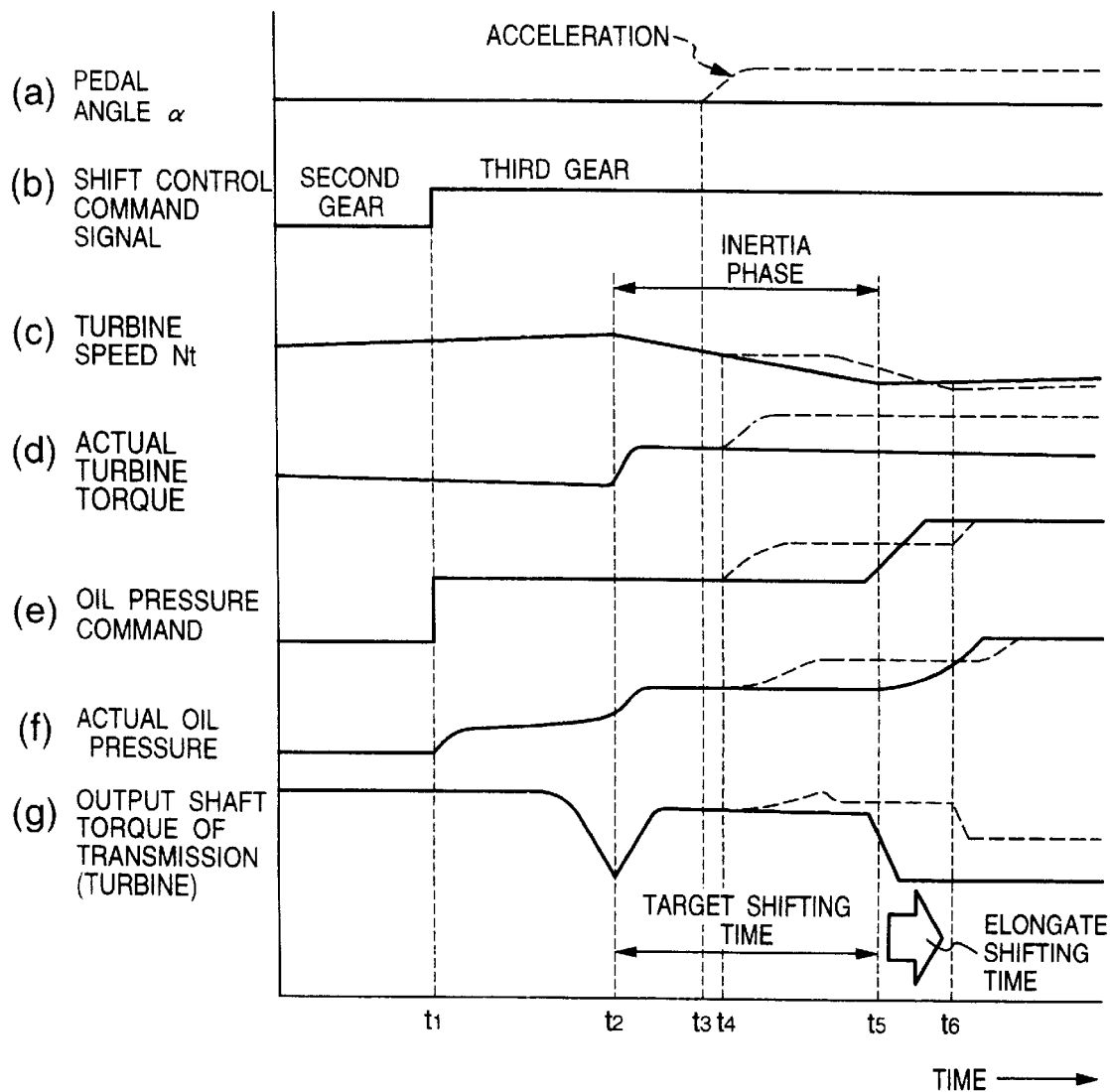

CONTROL APPARATUS AND METHOD FOR AUTOMATIC TRANSMISSION BY OIL PRESSURE ON CLUTCH

CROSS-REFERENCES TO RELATED APPLICATIONS

The present application relates to subject matters described in co-pending applications Ser. No. 08/998,735 filed on Dec. 29, 1997 and Ser. No. 09/201,131 filed on Nov. 30, 1998. The disclosures of these applications are incorporated herein by reference.

BACKGROUND OF THE INVENTION

The present invention generally relates to techniques for controlling the automatic transmission used in automobiles, and particularly to a technique for electronically controlling the working oil pressure on one or more clutches that is caused to act at the time of gear shifting.

The automatic transmission generally includes a torque converter coupled with the output shaft of engine, gear units that are connected to the output shaft of the torque converter and have a plurality of driving ranges, and at least two clutches that are acted when the automatic transmission makes gear shifting. Most of the clutches for use in automatic transmission are generally multiple-disk clutches. The gear shifting is performed during the interval in which one clutch is disengaged and the other one is engaged. The clutch is generally driven by oil pressure. Since the transfer torque is changed by the change of the working oil pressure on the engaged clutch, it is important to control the oil pressure of clutch.

A conventional example is given in U.S. Pat. No. 4,922,424 which describes an automatic transmission control for disengaging and engaging clutches by electronically controlling the working oil pressure of clutch. According to this US patent, control values for use in controlling the working oil pressure of the engaged clutch at the time of upshifting and the working oil pressure of the disengaged clutch at the time of downshifting are calculated from a predetermined functional equation based on engine speed, turbine speed and oil pump capacity coefficient of torque converter. The engine speed is the input shaft speed of torque converter, the turbine speed is the output shaft speed of torque converter, and the pump capacity coefficient is determined by the characteristics of the torque converter. The control technique in this US patent enables the working oil pressure of clutch to be correctly and precisely controlled and the transfer torque of clutch to be controlled most suitably to the driving condition of car even though the automatic transmission is changed in its performance after a long time usage.

FIG. 12A is a signal diagram to which reference is made in explaining the controlled operation of the oil pressure type clutch that makes automatic shifting in the conventional automatic transmission. It is assumed that after the car driver depresses the accelerator pedal and makes the car reach a desired cruising speed, he keeps the accelerator pedal as it stands as shown in FIG. 12A by the solid line (a). Under this condition, a shift control command (at (b) in FIG. 12A) is generated according to a shift control program that is determined by the car's speed, and the accelerator pedal angle or throttle opening. The automatic transmission has a shift control program as, for example, shown in FIG. 12B. The curve shown by 1→2 shows the position in which a shift control command to change from the first to second gear is produced. Similarly, the upshifting command curves are shown for the shifting from the second to third, and third to fourth gear. The downshifting command curves are not shown.

When a shift control command (at (b) of FIG. 12A) occurs at time t1 ordering to shift from the second to third gear, the disengaged side oil pressure (not shown) that is applied from the oil pump to the disengaged clutch is reduced. At the same time, the engaged side oil pressure (at (f) of FIG. 12A) to be applied to the engaged clutch is increased. This engaged side oil pressure (f) is generated by a hydraulic control system according to an engaged side oil pressure command value ((e) of FIG. 12A). When the engaged side oil pressure (f) is increased enough at time t2, the shifting operation is started. The interval from time t2 to time t5 is the target shifting time, within which the shifting operation is required to complete.

According to the conventional example mentioned above, as indicated by the solid line curves in FIG. 12A when the accelerator pedal is kept at a constant angle during the shifting operation, the shifting operation from the second to third gear is completed at the target time t5, and the turbine speed ((c) of FIG. 12A) is reduced to a low value. However, if the accelerator pedal is further depressed to accelerate at time t3 in the process of the shifting operation, the shifting interval exceeds the target time to extend to time t6 at which the shifting operation ends, as indicated by the broken line. This extension will cause the clutch to wear away or break down, and reduce the performance of the automatic transmission.

SUMMARY OF THE INVENTION

The inventors of this application have found that the delay of this shifting operation is ascribed to the delay of the response of the oil pressure system, and developed a novel control technique for automatic transmission that allows the shifting operation to complete without delay even if the oil pressure system has a response delay.

According to the prior art, the values of the engaged side oil pressure command ((e) of FIG. 12A) are decided by the values of the required transfer torque of clutch that are determined by the values of the actual turbine torque of torque converter (the output shaft torque of torque converter) as shown in FIG. 12A at (d). If the accelerator pedal is kept depressed a constant amount, the required transfer torque of clutch is not changed, and thus the actual oil pressure converges at the oil pressure command value within the target time even if there is a delay (period of time from t1 to t2) with which the oil pressure system responds to the oil pressure command to provide the actual oil pressure fitted to the command.

However, when the engine torque (load) is increased by acceleration operation, the turbine torque increases, and thus the oil pressure command value is changed in accordance with the required transfer torque of clutch that is increasing. There are, however, a delay with which the actual engine torque is changed in response to the acceleration operation (operation of accelerator pedal), and a response delay of the oil pressure system. Thus, the actual oil pressure does not immediately follow a new oil pressure command value that has been determined on the basis of the increased turbine torque. When the oil pressure is not raised enough relative to the increased turbine torque, the transfer torque of clutch is insufficient, allowing unnecessary slip of clutch to occur. Therefore, the shifting time is increased as shown in FIG. 12A by the broken lines, and the clutches are worn down.

The oil pressure control apparatus for automatic transmission according to the invention controls at least one clutch in the automatic transmission connected to an engine output to be engaged or disengaged by oil pressure, thus making shifting operation. In this case, the output torque of engine is calculated on the basis of a parameter that represents the load on the engine, and the engine speed. In addition, the transfer torque required for the clutch is computed from at least the calculated output torque of engine and the engine speed. Then, an oil pressure command value acting on the clutch is determined in accordance with the computed transfer torque.

According to the embodiments of the invention, the parameter that represents a load on the engine may be, for example, the amount of intake air flow of the engine, rate of throttle opening, fuel injection pulse width, fundamental amount of fuel injection or a combination of these parameters. These parameters can be detected in a short time with almost no delay from the depression of the accelerator pedal. Therefore, even if the acceleration operation is made after the issue of a shift control command, an oil pressure command value for clutch is immediately determined on the basis of the amount of the accelerator pedal angle or depression stroke without waiting for the increase of the turbine torque (engine torque). Thus, the time required to change the actual working oil pressure can be decreased, and hence compensate for the response delay of the oil pressure system.

According to the invention, even if the actual engine torque is abruptly changed during the gear shifting, the oil pressure acting on the clutches can be correctly controlled with good response to satisfy the shift control program, and the clutches can be prevented from being worn away by slipping.

It has become important to establish a transmission control system that can remove one-way clutch and electrically control the oil pressure directly that acts on clutches, to disengage and engage the clutches from the aspects of small-sized and light weight automatic transmission and improvement of control performance. In this system, it is absolutely necessary to control the clutch acting oil pressure with good precision so as to suppress the torque fluctuation (shock) during gear shifting. Therefore, it is necessary that even if aging occurs in the automatic transmission, the clutch acting oil pressure be correctly determined without delay, and that the transfer torque of clutch be controlled most suitably relative to the driving condition. The control system for automatic transmission according to the invention can satisfy the above requirements.

BRIEF DESCRIPTION OF THE DRAWINGS

FIG. 7 is a graph showing the relation between the transfer torque of clutch and oil pressure command value.

FIG. 9 is a graph showing the friction coefficient of clutch.

FIG. 12A is a timing chart of signals in the oil pressure control apparatus for clutch according to the prior art.

DESCRIPTION OF THE PREFERRED EMBODIMENTS

An embodiment of the invention will be described in detail with reference to the accompanying drawings.

Figure 1:
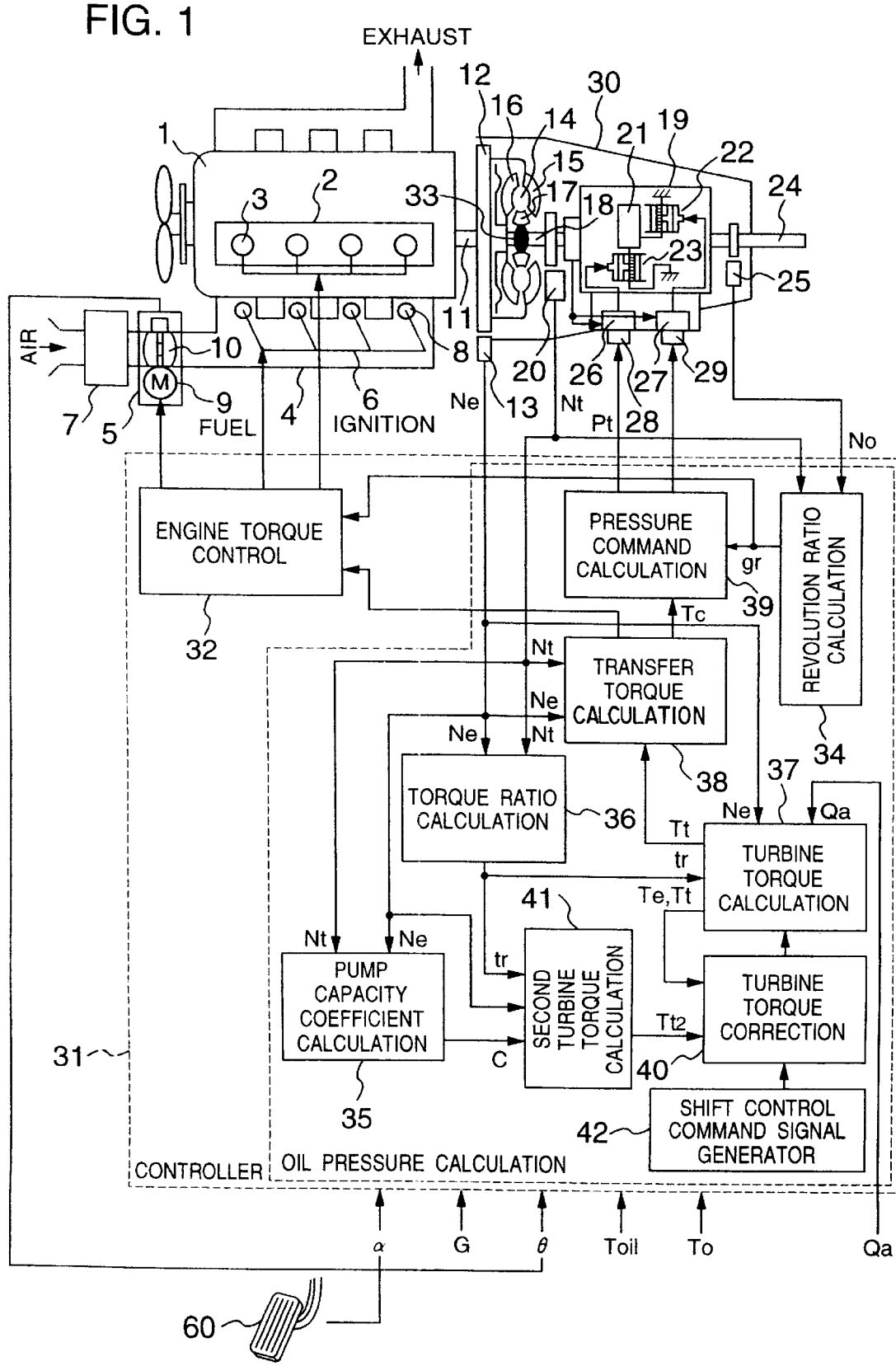
FIG. 1 is a block diagram of a control system for automatic transmission, that has an oil pressure control apparatus according to an embodiment of the invention.
Figure 2:
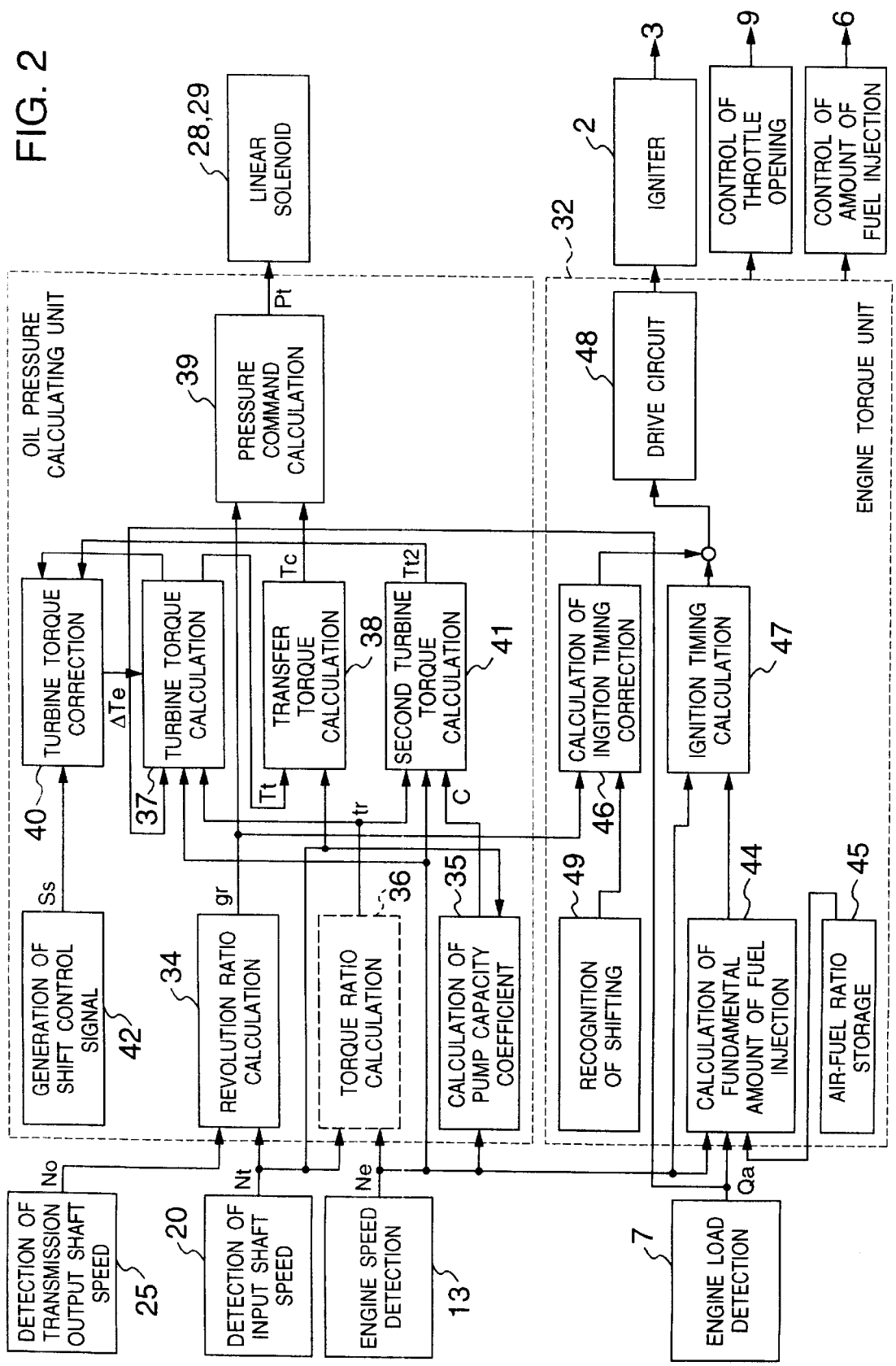
FIG. 2 is a detailed block diagram of the oil pressure control apparatus and engine control unit shown in FIG. 1.

FIG. 1 shows one embodiment of the invention. FIG. 2 is a detailed block diagram of the control system according to an embodiment of the invention. Referring to FIG. 1, there is shown a 4-cylinder engine 1 in this embodiment. The engine 1 has an ignition device 2 provided. The ignition device 2 has four igniters 3 associated with the number of cylinders of engine 1. An intake manifold 4 for drawing air into engine 1 has an electronically controlled throttle 5 for adjusting the amount of air flow passing through the manifold, a fuel injector 6 for injecting fuel and an air flow meter (engine load detecting means) 7. The fuel injector 6 has four fuel injection valves 8 corresponding to the number of cylinders of engine 1. Moreover, fuel may be directly injected into the cylinders of engine 1 from the injection valves 8. The electronically controlled throttle 5 controls the amount of air flow by driving a throttle valve 10 by an actuator 9. Generally, the throttle valve 10 and an accelerator pedal 60 are connected by a mechanical wire or links (not shown), and thus when the pedal is depressed, the valve is operated.

A flywheel 12 is mounted on a crank shaft 11 of engine 1. The flywheel 12 has an engine speed sensor 13 mounted to detect the speed of crank shaft 11, or the revolution speed Ne of engine. A torque converter 14 directly connected to this flywheel 12 is formed of a pump 15, a turbine 16 and a stator 17. The output shaft of turbine 16, or an input shaft 18 of the transmission is directly connected to a stepped transmission 19. Here, the so-called clutch-to-clutch transmission 19 is given as an example, which executes gear shifting by engaging and disengaging two clutches 22, 23. On the input shaft 18 of the transmission are mounted an input shaft speed detecting unit 20 for measuring the revolution speed Nt (turbine speed) of the input shaft of the transmission and an input shaft torque sensor 33 for measuring an input shaft torque (turbine torque) of the transmission Tt. The transmission 19 is composed of a planetary gear 21, and clutches 22, 23. When the clutches 22, 23 are engaged or disengaged, the gear ratio of the gear 21 is changed, and gear shifting is performed. These clutches 22, 23 are controlled by spool valves 26, 27 and linear solenoids 28, 29 (pressure regulator). In addition, the transmission 19 is connected to an output shaft 24 that has an output shaft speed sensor 25 mounted for detecting the number of revolutions of shaft 24, or a so-called vehicle speed sensor 25. These components constitute an automatic transmission 30.

The engine 1, and the actuator for driving the automatic transmission 30 are controlled by a controller 31. The controller 31 is supplied with a throttle opening angle θ, input shaft speed Nt, engine speed Ne, output shaft speed No, oil temperature Toil, accelerator pedal angle α, acceleration sensor signal G, intake air flow Qa, input shaft torque To and so on for the control. An engine torque control unit 32 within the controller 31 produces control signals to the electronically controlled throttle 5, fuel injector 6 and ignition unit 2.

The controller 31 includes an MPU, a memory device, an A/D converter, a D/A converter and an interface unit for receiving and outputting signals from/to the outside. The memory may be a semiconductor memory or a recording medium of other type, and this memory has a region for storing control programs relative to the engine and automatic transmission, and a data region for arithmetic processing of data. An engine torque control unit 32 and oil pressure calculating unit 35 may use separate MPUs or a common MPU.

Figure 3:
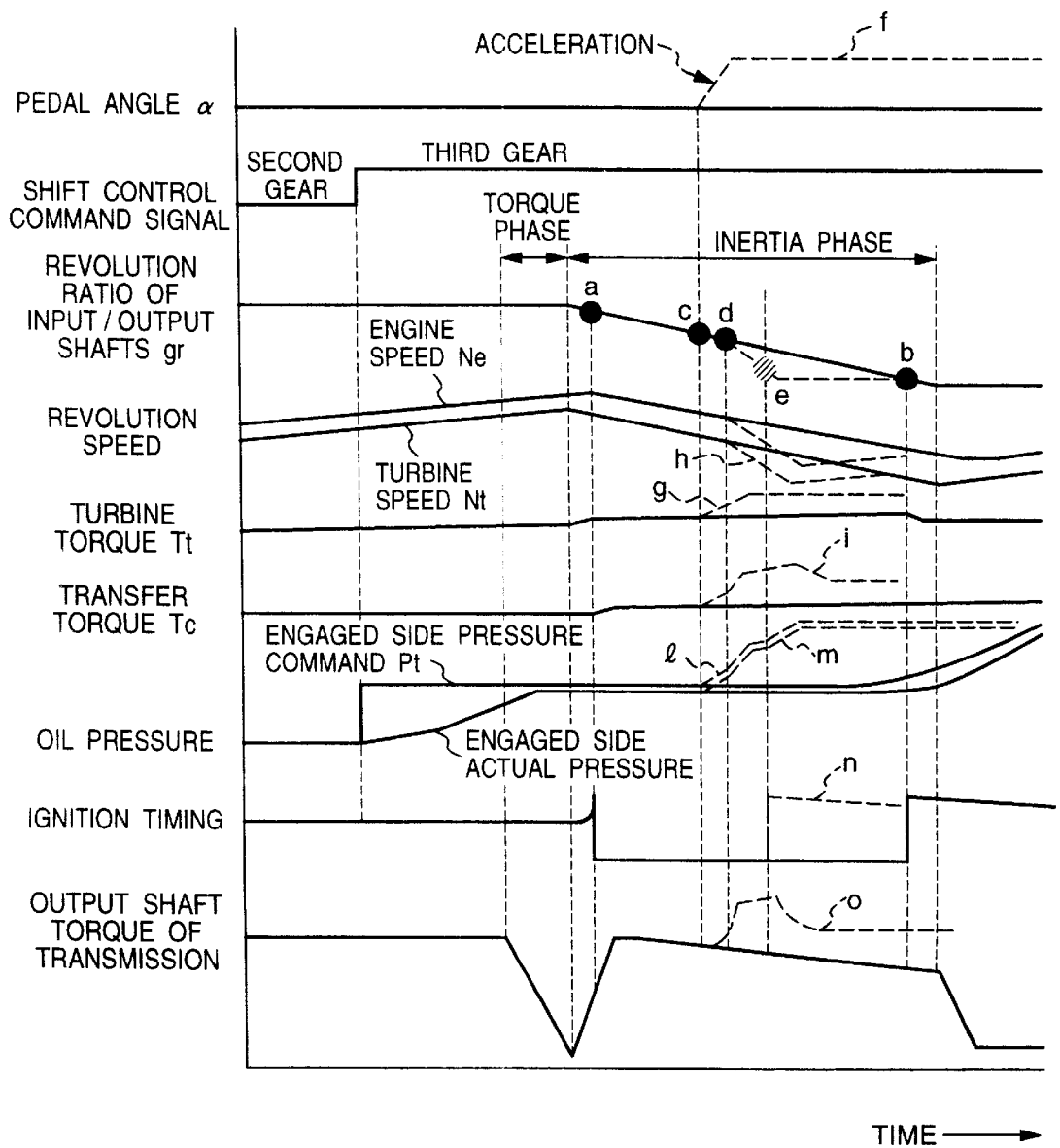
FIG. 3 is a timing chart of signals in the oil pressure control apparatus according to the embodiment of the invention under the condition that the shifting is made from the second to third gear.
Figure 4:
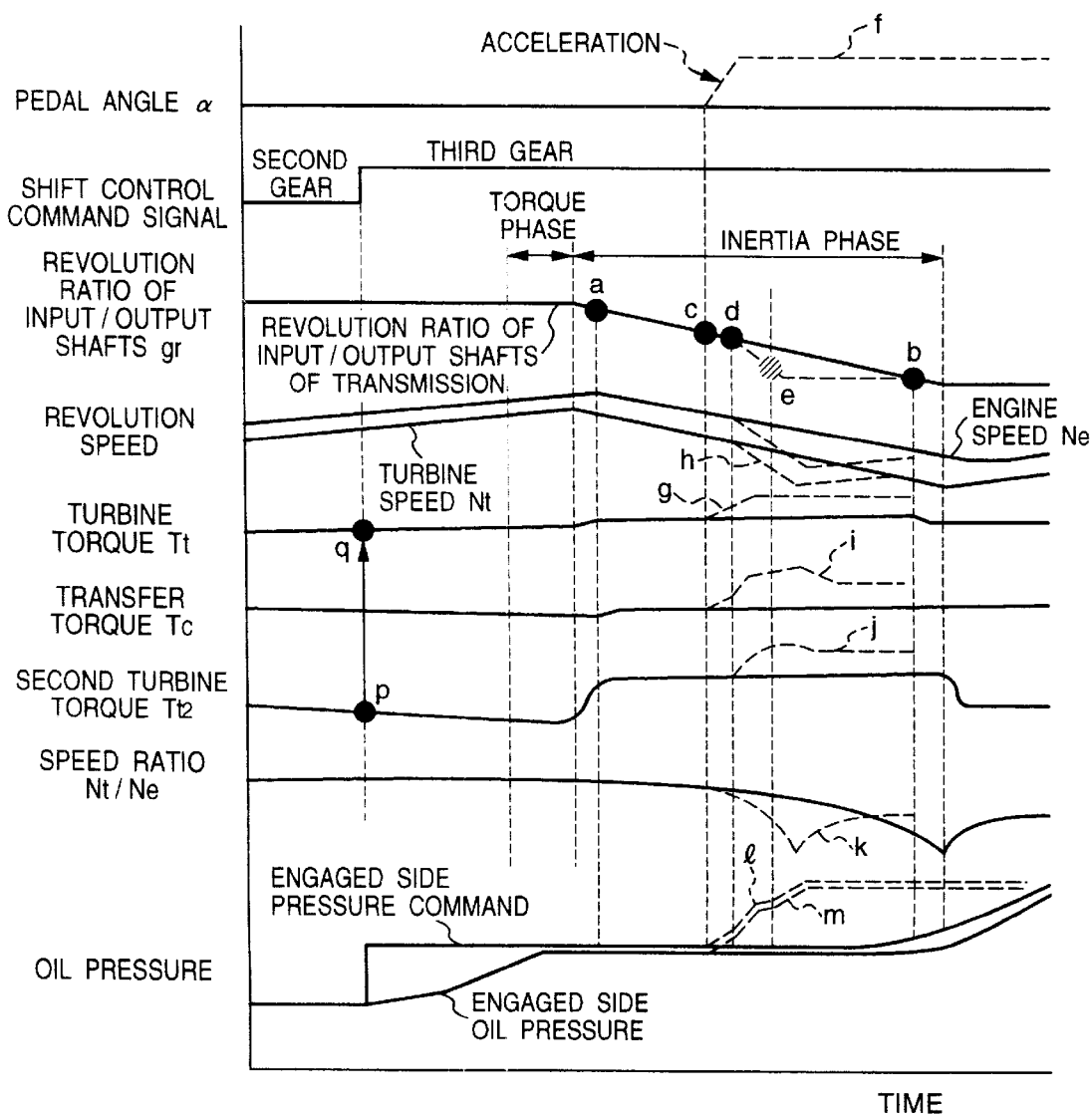
FIG. 4 is a timing chart of signals in the oil pressure control apparatus according to the embodiment of the invention under the control that torque correction is made and that the shifting is made from the second to third gear.
Figure 5:
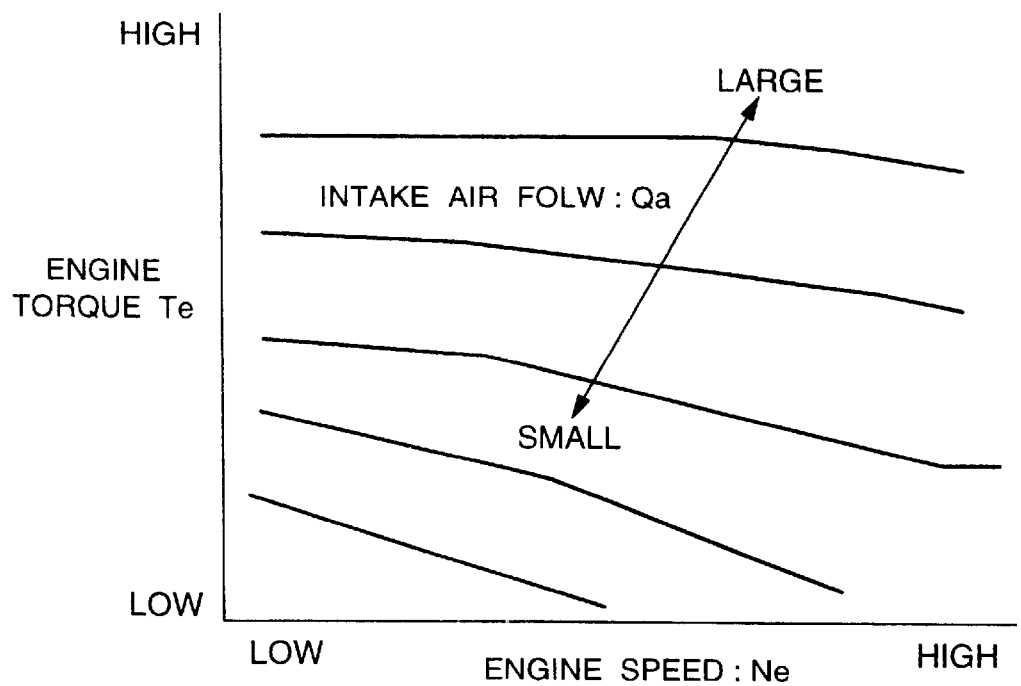
FIG. 5 is a graph showing the engine torque with respect to parameters of engine speed and amount of air that is drawn into engine.
Figure 6:
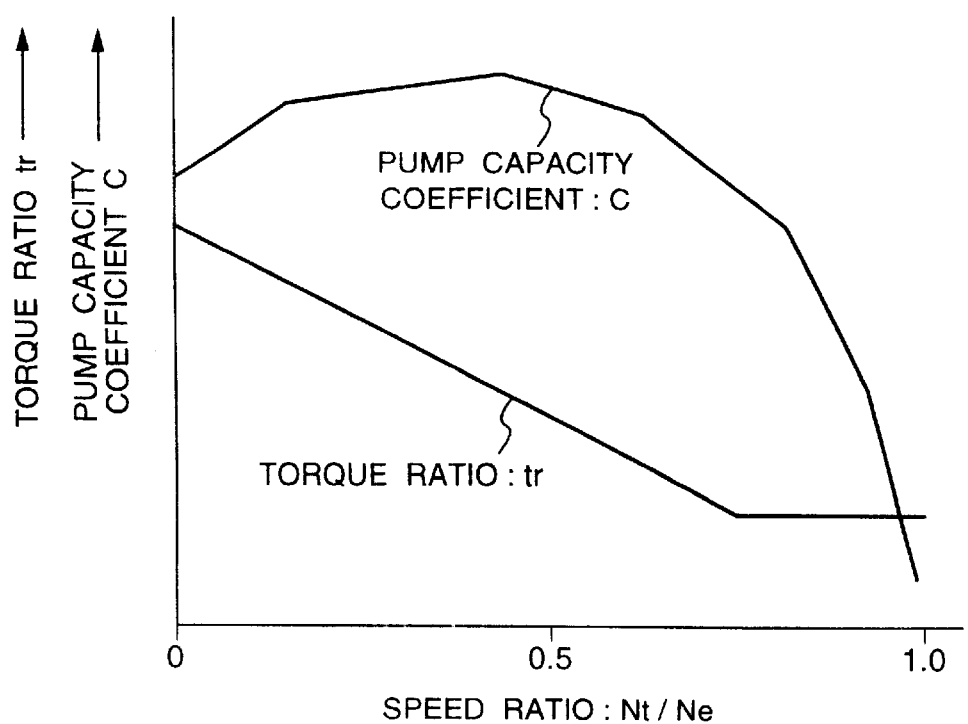
FIG. 6 is a graph showing the characteristics of torque converter.

The control blocks shown in FIGS. 1 and 2 will be described with reference to FIGS. 3, 4, 5, 6 and 7. FIG. 2 is a detailed block diagram of portions associated with oil pressure control and engine control within the control system shown in FIG. 1. FIG. 3 shows the second-to-third shift control program in the control apparatus according to an embodiment of the invention. FIG. 4 shows the second-to-third shift control program given from another aspect. FIG. 5 shows one example of the engine torque characteristic. FIG. 6 shows the torque converter characteristic stored in a form of data map in a memory. FIG. 7 shows the relation between the transfer torque and clutch oil pressure command value. Here, a description will be made of a method for controlling the working oil pressure of engaged clutch at the time of upshifting. First, the input shaft speed Nt and output shaft speed No are supplied to a revolution ratio calculating unit 34 in the controller 31. The revolution ratio gr of the transmission 19, or the so-called gear ratio is calculated in the unit 34. In addition, the input shaft speed Nt and engine speed Ne are supplied to a pump capacity coefficient calculating unit 35 and torque ratio calculating unit 36, respectively. The coefficient calculating unit 35 calculates a pump capacity coefficient C (FIG. 6) from the speed ratio (Nt/Ne) between the input shaft speed Nt and engine speed Ne. Similarly, the torque ratio calculating unit 36 calculates a torque ratio tr (FIG. 6) from the speed ratio (Nt/Ne). The intake air flow Qa detected by the air flow meter (engine load detector) 7, the engine speed Ne and the torque ratio tr are supplied to a turbine torque calculating unit 37. This unit calculates the turbine torque Tt from the engine torque Te and torque ratio tr that are determined from the engine torque characteristic shown in FIG. 5. The engine torque characteristic shown in FIG. 5 is previously stored as a data map in a memory. The turbine torque Tt and turbine speed Nt are supplied to a transfer torque calculating unit 38, where a go transfer torque Tc is calculated from Equation (1).

$$It*dNt/dt+Cd*Nt=Tt-Tc \quad (1)$$

$$Tc=\mu*R*N*(A*Pt-F) \quad (2)$$

It: inertia moment of engine, torque converter
Cd: viscosity resistance coefficient
Tc: transfer torque
μ: friction coefficient of clutch
R: effective radius of clutch
N: number of clutch disks
A: pressure receiving area of clutch piston
F: repulsion of clutch
Pt: oil pressure command value In addition, the transfer torque Tc is supplied to an oil pressure command value calculating unit 39, where an oil pressure command value Pt to clutch is calculated from the Equation (2). Equation (2) can be expressed as in FIG. 7. The oil pressure command value Pt including the initial period of shifting (torque phase-inertia phase beginning) can be expressed by a function f of abscissa Tt, Nt. In other words, the transmission characteristics (It, Cd and so on) of the two equations are experimentally acquired in advance, and those values are stored in a memory. The characteristic values are read from the memory, and the equation (2) is calculated so that Pt can be found. Other signal than intake air flow Qa that can be applied to the invention as a parameter representing the engine load is either one of the throttle opening angle signal, fuel injection pulse width signal, and fundamental amount of fuel injection, or a combination of those parameters.

An example of the above execution will be described with reference to FIG. 3. In FIG. 3, the solid lines indicate shift control programs in the case where the accelerator pedal is kept depressed at a constant angle, and the broken lines are those in the case when the accelerator pedal is further depressed during the gear shifting, or when the engine torque is increased. The value of each parameter on the ordinate tends to increase. When gear shifting is made, a shifting command signal is generated, and the disengaged side oil pressure (not shown) on the disengaged clutch is decreased. At the same time, the engaged side oil pressure on the engaged clutch is increased. This engaged side oil pressure is controlled by an engaged side oil pressure command value. According to the embodiment of the invention, the engaged side oil pressure command value is set according to the value of the transfer torque Tc that is determined by the intake air flow Qa.

In addition, the engine torque is temporarily reduced, and the shifting time is set to be less than a predetermined period in order that the torque on the clutches can be prevented from abrupt change, thus protecting the clutches from damage. Actually, the start of the gear shifting can be recognized by detecting if the value of the revolution ratio gr has changed. After the start of shifting, the engine torque is controlled to decrease over the period from the black dot a to b. Thus, the output shaft torque of the transmission exhibits a smooth characteristic during the shifting. Here, the reduction of the engine torque is attained by retarding the ignition timing from the reference ignition timing. The reduction of the engine torque can also be achieved by other means such as fuel cut, air-fuel ratio control and air flow control. In FIG. 2, the temporary reduction of the engine torque by the ignition timing control may be performed according to, for example, the method disclosed in U.S. Pat. No. 5,573,476. However, because misfire may be caused when the ignition timing retard control is executed in the lean burn engine including the so-called direct injection engine that is driven in a region of large air-fuel ratio, the torque reduction control is difficult to perform. Thus, the fuel flow control (air fuel ratio control) or air flow control is utilized instead.

The case where the accelerating operation is performed as indicated by the broken lines will be described. When the accelerator pedal is depressed at the time of black dot c during the gear shifting, it is necessary to raise the engaged side oil pressure and thereby to increase the transfer torque of clutch as the engine torque increases. However, actually when an engaged side command value is supplied to the linear solenoid 28, 29, the engaged side oil pressure on the clutch reaches the same value as the command with a delay. Therefore, when the oil pressure command value is determined by the torque that is decided by the torque converter characteristic and actual torque converter speed ratio or by the torque from a torque sensor as in the prior art, there is a delay between the increase of engine torque and the actual engaged side oil pressure, and hence the clutch will slip.

Thus, according to the invention in which the engaged side oil pressure command value is determined by using the transfer torque that is found on the basis of the control parameter Q corresponding to the engine load, the engaged side oil pressure command value (λ) is changed (black dot c) substantially in synchronism with the operation (f) of the accelerator pedal. Consequently, the engaged side oil pressure (m) to be actually applied on the clutch can be increased faster than the change (black dot d) of the engine torque. Therefore, the gear shifting ends at around the point of black dot e, and the output shaft torque (o) of the transmission can be satisfactorily changed by the accelerator pedal as the driver likes. At the same time, the ignition timing (n) retard ends at the point of shaded dot e.

As described above, in the oil pressure command value setting by using the control parameter of engine load, the oil pressure control can be made with good timing. Another embodiment for further improving the estimated precision of turbine torque Tt will be described. The engine characteristic for determining the engine load for estimating the turbine torque as shown in FIG. 5 does not include auxiliary loads such as compressor of air conditioner and alternator. In addition, since the engine itself easily ages, the estimated turbine torque Tt as the engine characteristic after use for two years, for example, is different from that after use for five years. Thus, it is necessary that the estimated torque value be corrected by the torque detector considering the auxiliary loads and aging. A turbine torque correcting unit 40 is therefore provided as shown in FIGS. 1 and 2. The torque ratio tr produced from the torque ratio calculating unit 36 and the pump capacity coefficient C produced from the capacity coefficient calculating unit 35 are supplied to a second turbine torque calculating unit 41, where a second turbine torque Tt2 is calculated from the following equation (3).

$$Tt2 = t_r(Nt/Ne) * \{c(Nt/Ne) * Ne * Ne - k1 * dNt/dt\} \quad (3)$$

tr: torque ratio of torque converter (function of Nt/Ne)
c: pump capacity coefficient of torque converter (function of Nt/Ne)
k1: correction constant The second turbine torque Tt2 that is found from the torque converter characteristic includes the effect of the auxiliary loads, and the change of the estimated value due to aging is small. Therefore, it is effective to correct the turbine torque estimated by the engine load. In order to correct, the turbine torque and the second turbine torque are supplied to the correcting unit 40, and the difference therebetween is supplied to the turbine torque calculating unit 37 and added to the turbine torque found from the engine load. This correction is executed as shown in FIG. 4 (black dots q, p) each time a trigger signal is supplied from a shifting command signal generator 42, thus the newest torque correction being achieved. In addition, although the torque correction is made at any time during the period from when the shifting command signal is generated to when the actual shifting is started, the torque correction accuracy can be improved the more, the nearer to the start of the actual shifting the correction is made.

The torque correction mentioned above is for the automatic transmission vehicle in which the torque converter is installed. The torque correction can be made in the driving region in which torque converter is not operated (in the lock-up region) or in the automatic transmission car having no torque converter. As, for example, disclosed in U.S. Pat. No. 4,627,312, the automatic transmission in which the manual transmission mechanism of two-shaft synchronous engagement type is made to be automatic shifting has no torque converter. In this type of car, it is necessary that the input shaft torque of the transmission be corrected by using the torque signal To produced from the torque sensor 33 that is installed on the input shaft of the transmission mechanism. The torque value obtained from the torque sensor has a higher precision than the torque value estimated from the torque converter characteristic. Moreover, the turbine torque Tr used for the calculation of the engaged side oil pressure command value Pt must be all treated as engine torque Tc. Therefore, in order to calculate the transfer torque, it is necessary to use the engine torque Te and the engine speed Ne.

Figure 13:
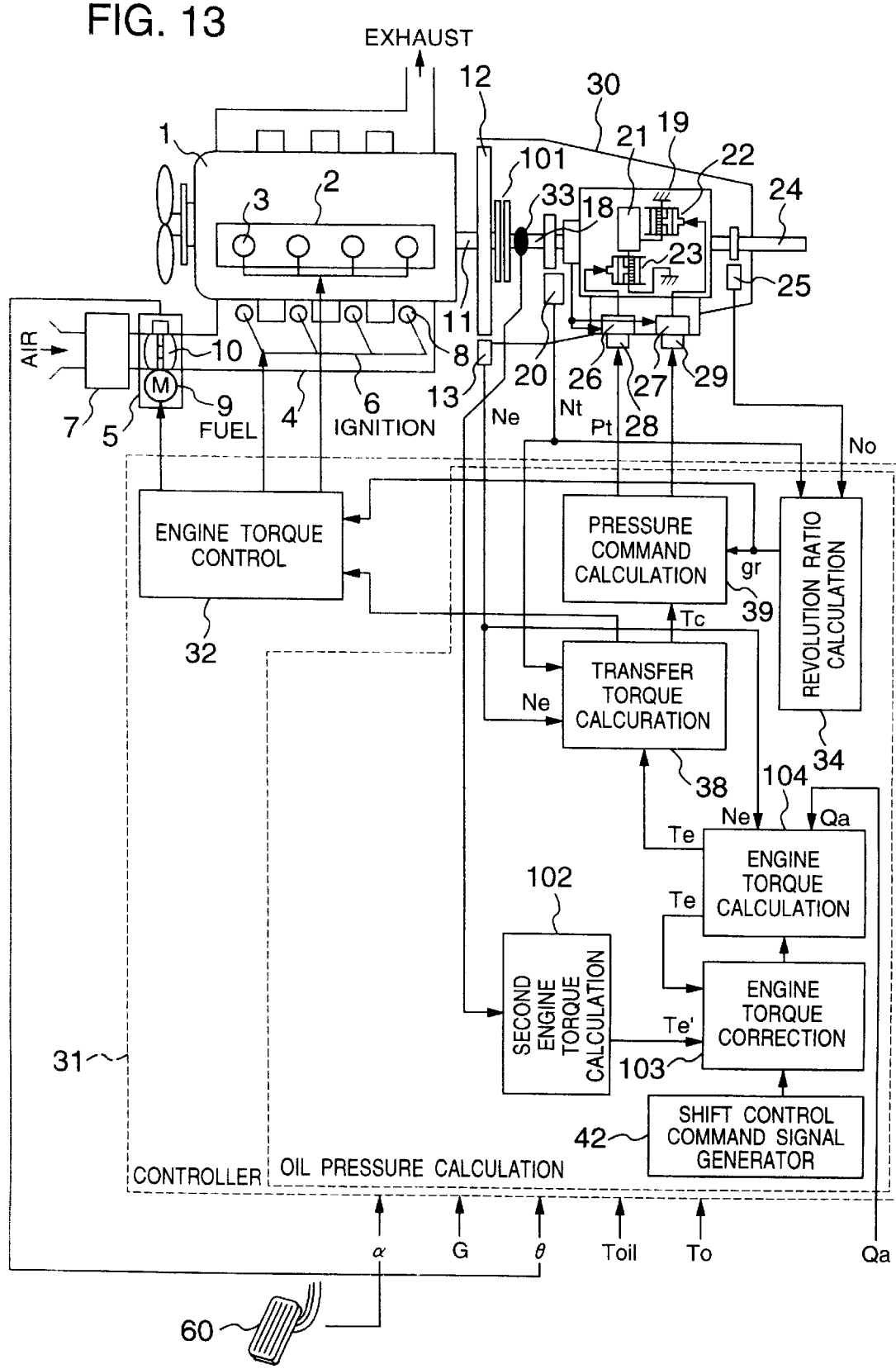
FIG. 13 is a block diagram of a control system for an automatic transmission, which has no torque converter, according to an embodiment of the present invention.

FIG. 13 is a block diagram of a control system for an automatic transmission having no torque converter.

In this system, a clutch 101 is installed in place of a torque converter between the engine output shaft 11 and the input shaft 18 of the transmission 19. The clutch 101 may be an electromagnetic clutch or a multi-disk clutch, and driven by an electromagnetic solenoid or other type of actuator (not shown). The transmission 19 is basically same as one shown in FIG. 1, and has hydraulic controlled clutches 22 and 23. The oil pressure command value Pt for the engaged clutch is calculated basically in a same manner as of the system shown in FIG. 1. However, in this embodiment, the engine torque Te is used instead of the turbine torque Tt for calculation of the oil pressure command value Pt. The engine torque calculation unit 104 determines the engine torque value Te from the intake air flow Qa by referring to the map shown in FIG. 5. The engine torque Te obtained from the intake air flow Qa does not concern the auxiliary loads such as a compressor of air conditioner, an alternator and so on. In order to compensate the effects of the auxiliary loads and the aging of the engine (causing a change of the characteristic of FIG. 5), the engine torque correction unit 103 corrects the engine torque Te obtained from the air flow Qa with the actual engine torque (the second engine torque value) Te' detected by the torque sensor 33. The second engine torque calculation unit 102 determines the actual engine torque as the second engine torque Te1 from the output signal of the torque sensor 33.

The correction of the turbine torque will be described with reference to FIG. 4. In FIG. 4, the solid lines indicate the shift control program in the case where the accelerator pedal is kept depressed at a constant angle, and the broken lines are the shift control program in the case when the accelerator pedal is depressed during the gear shifting operation. When the accelerator pedal is depressed during the shifting operation, the turbine torque Tt (g) found from the engine load is changed substantially in synchronism with the change (f) of the accelerator pedal. Thus, the transfer torque Tc (i) found from the turbine torque Tt (g) and turbine speed Nt(h) is changed simultaneously. The engaged side oil pressure command value Pt (1) is also changed (black dot c) according to the transfer torque Tc (i). In addition, since the engaged side oil pressure command value Pt is determined on the basis of the transfer torque Tc(i), it is also changed according to the change (h) of the turbine speed Nt. On the other hand, since the second turbine torque Tt2 (j) substantially coincident with the actual turbine torque Tt is calculated from the speed ratio (Nt/Ne) (k), it starts to change finally at the time of black dot d when the accelerator pedal is depressed. Thus, the change of the actual engaged side oil pressure Pt on the clutch occurs faster than that of the second turbine torque Tt2, and hence the gear shifting can be completed without increasing the clutch slipping. From the above results, it will be found that the invention makes good operation if the engaged side oil pressure command value is changed faster than the speed ratio that is the base for calculating the second turbine torque Tt2. The oil pressure command value is any one of the PWM (Pulse Width Modulation) signal, voltage signal and the current from the solenoid.

Figure 8:
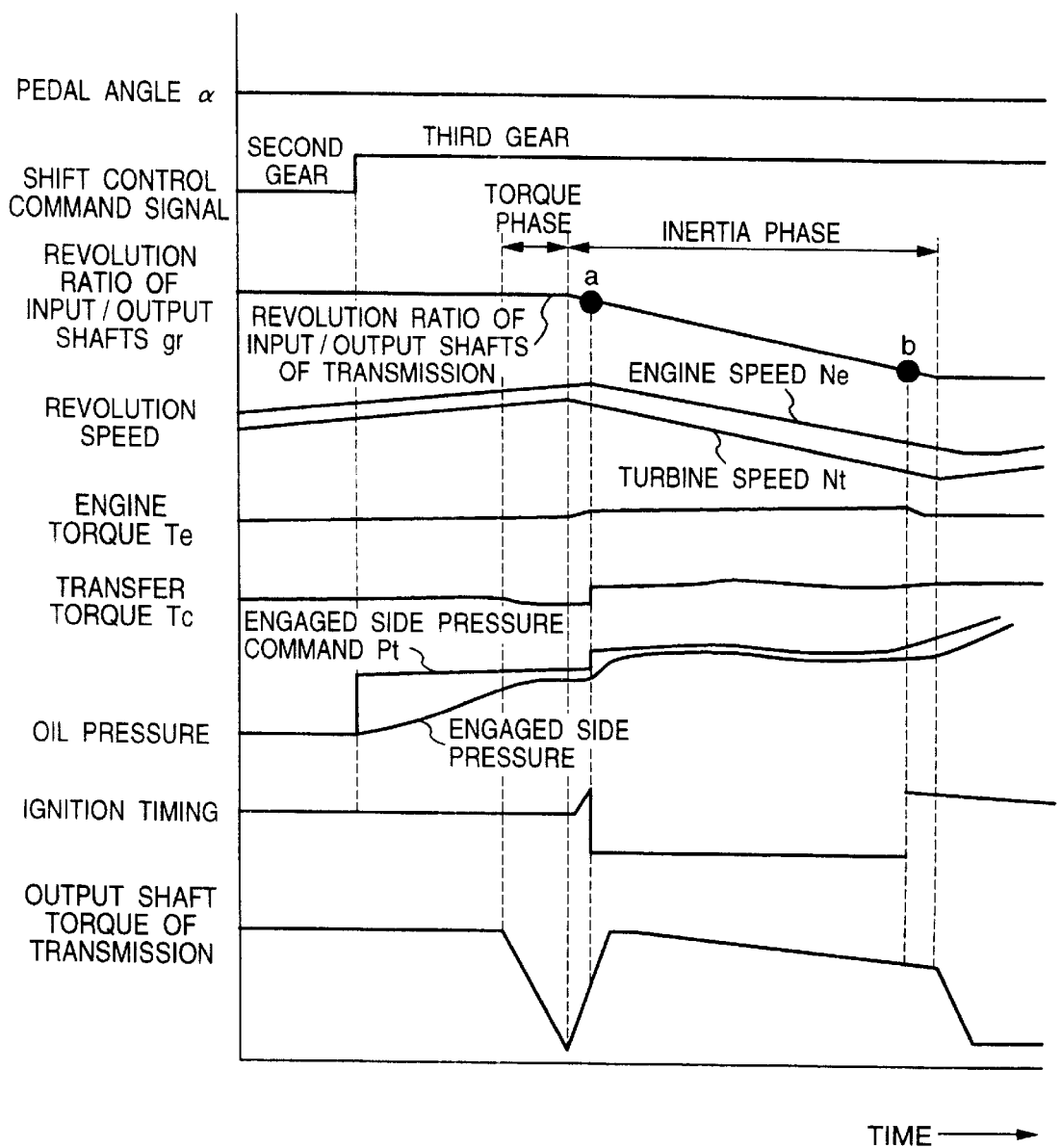
FIG. 8 is a timing chart of signals in the gear shifting control under the condition that the friction coefficient of clutch is changed by the aging of clutch.

An embodiment of the shifting control method for the case where the clutch friction coefficient is changed due to aging will be described with reference to FIGS. 8 and 9. FIG. 9 is a graph showing the friction coefficient characteristic of clutch. Referring to FIG. 9, when the difference between the input and output revolutions of clutch is zero, it means that the clutch is completely engaged. If the clutch is completely disengaged, the revolution difference is the maximum. As to the engaged side clutch at the time of upshifting, the revolution difference starts to change from the maximum side, and decreases as the oil pressure increases. The broken line indicates the friction coefficient of a brandnew clutch, and the solid line the friction coefficient after the change due to aging. The output shaft torque of the transmission during shifting is changed with the change of the friction coefficient of clutch. Thus, when the revolution difference of clutch is large, or at the initial timing (black dot a) of shifting shown in FIG. 8, the engaged side oil pressure command value is required to be changed according to the change of friction coefficient p shown in FIG. 7. Thus, a smooth output shaft torque of transmission can be obtained, and good shift control program can be attained. The reason for this is that the transfer torque derived from the equations (1) and (2) is used as the base for determining the oil pressure command value.

The above description is for the case when upshifting is made under the condition that the accelerator pedal is kept pressed at a constant angle. However, there is the case where downshifting is performed with the angle of pressed accelerator pedal being changed. The oil pressure control logic associated with downshifting will be described below.

Figure 10:
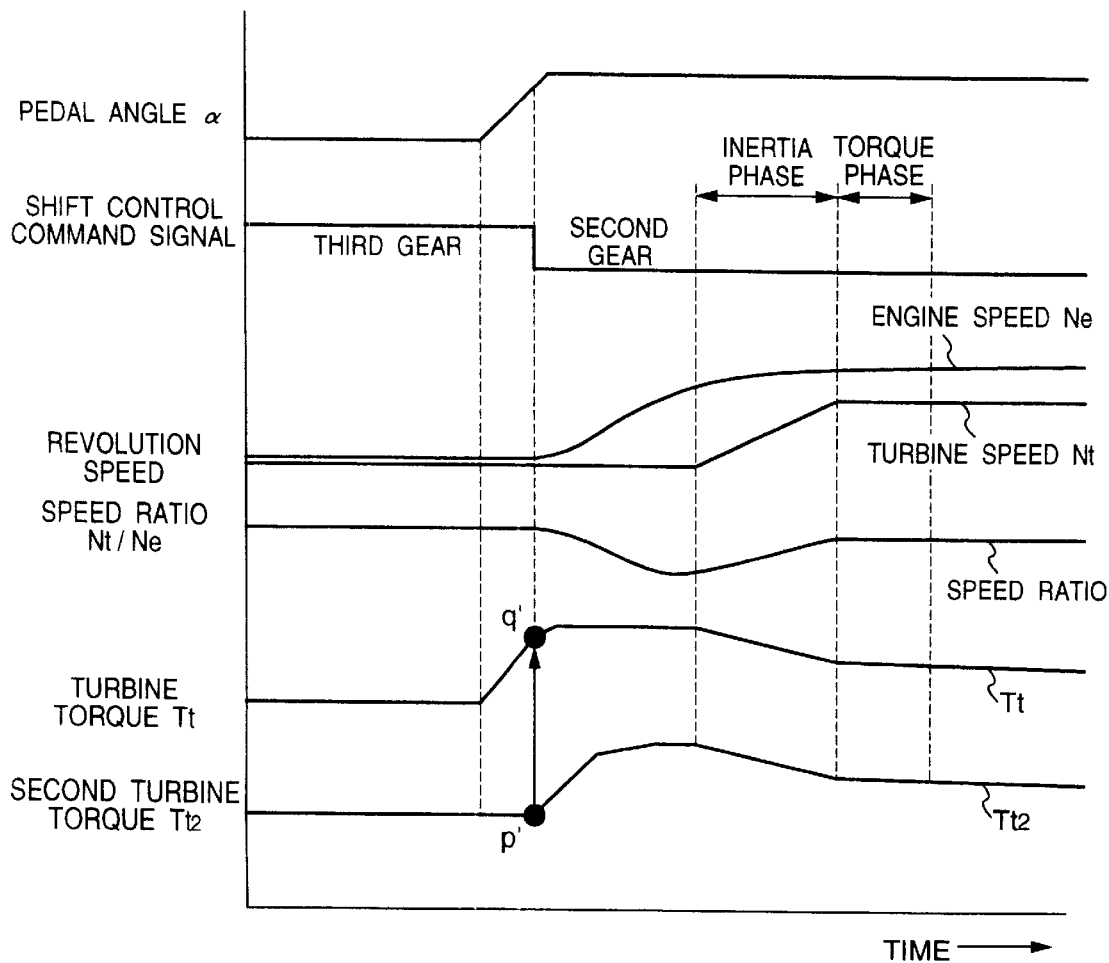
FIG. 10 is a timing chart of signals in the oil pressure control apparatus under the condition of downshifting.
Figure 11:
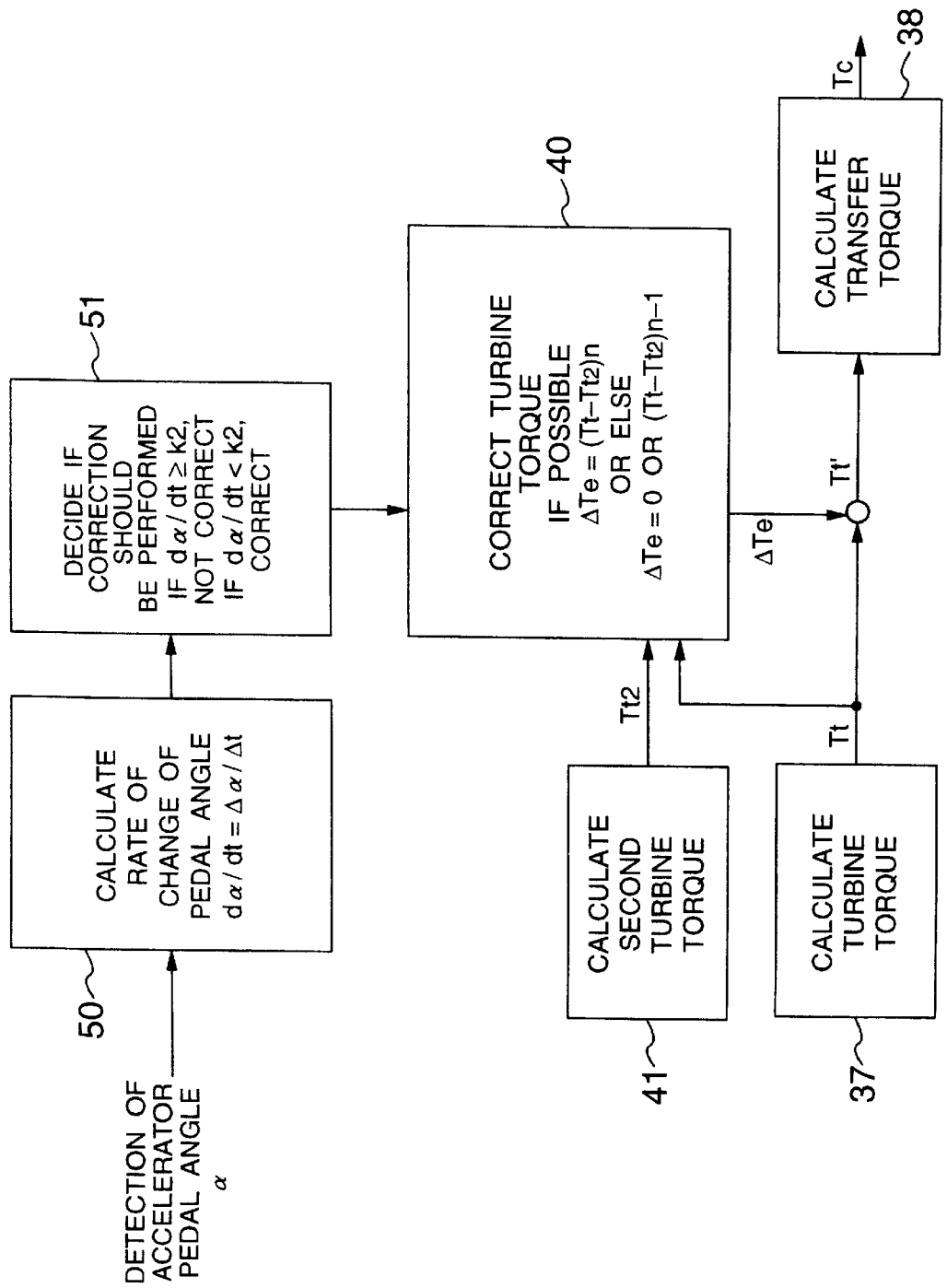
FIG. 11 is a block diagram of a process for correcting the torque value in the oil pressure control apparatus according to the embodiment of the invention.
Figure 12B:
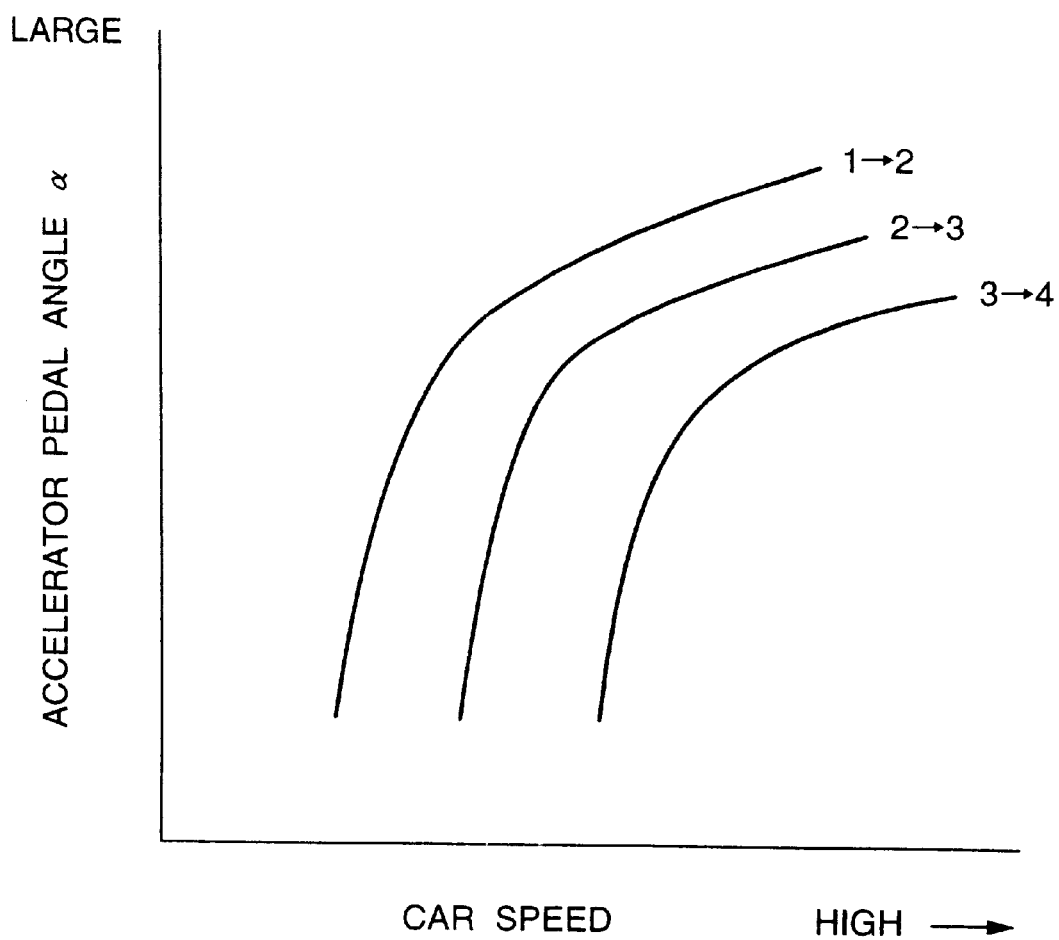
FIG. 12B is a graph showing one example of the shift control program in automatic transmission.

FIG. 10 shows the shift control program at the time of downshifting, and FIG. 11 shows the details of the method for the turbine torque correction.

Referring to FIG. 10, the downshifting (or kickdown) is generally performed when the accelerator pedal is deeply depressed. First, a shifting command signal is generated according to the accelerator pedal angle a, increasing the engine speed Ne. At the same time, the torque converter speed ratio starts to change. However, the turbine speed changes at the inertia phase, or at the shifting start timing. Thus, the oil pressure to be supplied to the clutch at the time of downshifting is set on the basis of the turbine torque Tt that is determined by the engine load. In addition, the turbine torque Tt is corrected by the second turbine torque (actual turbine torque). However, the timing of the change of turbine torque Tt is greatly different from that of second turbine torque Tt2. This is because the second turbine torque is calculated on the basis of the speed having a response delay while the turbine torque Tt is calculated on the basis of the engine load. Therefore, when the torque correction (comparison between P' and q') is performed at the time of generation of the shifting command signal, a large correction error occurs, preventing the torque correction from being made with high accuracy. Thus, a correction implementation deciding unit 51 must be provided as shown in FIG. 11. In other words, the rate of change of the accelerator pedal angle $\alpha$, or $d\alpha/dt$ indicating if the engine load has changed is calculated by a depression angle rate-of-change calculating unit 50, and supplied to the deciding unit 51. The deciding unit 51 decides if the depression rate-of-change $d\alpha/dt$ is larger than a decision constant k2 (a reference value for use in deciding if the depression angle is changed). If the depression angle is decided to have changed, it produces "no: 0". If the depression angle is not changed, it produces "yes: 1". The decision result is supplied to the turbine torque correcting unit 40. When supplied with "yes: 1", it substitutes the difference between the turbine torque Tt and second turbine torque Tt2 into the deviation of turbine torque $\Delta$Te. When supplied with "no: 0", it substitutes 0 into the $\Delta$Te or it substitutes into the $\Delta$Te a correction value $(Tt-Tt2)_{n-1}$ that is given at the time of upshifting in which the accelerator pedal is not changed. The difference between Tt and Tt2, or $(Tt-Tt2)_n$ is the current difference, and $(Tt-Tt^2)_{n-1}$ is the previous difference. The transfer torque Tc is calculated in the same way as in the embodiment shown in FIGS. 1 and 2. When the above control logic is employed, the torque correction is performed at the time of upshifting in which the accelerator pedal is not changed, but the torque correction is inhibited at the time of downshifting or "off-pedal upshifting" in which the accelerator pedal is changed in depression angle. The off-pedal upshifting will be occurred in running down on the gradual decline while removing the driver's food from the acclerator pedal. At the time of downshifting, since the correcting unit uses the correction value $(Tt-Tt^2)_{n-1}$ for the upshifting in which the accelerator pedal is not changed, satisfactory oil pressure setting can be made.

Therefore, the torque correction error can be prevented from occurring when the accelerator pedal is changed in depression angle, and hence the oil pressure control with high precision can be attained.

In the present invention, the two-shaft plane gears or the planetary gears may be used in the transmission 19. The automatic transmission control system of the present invention can also be applied to any other types of vehicles such as a vehicle having a port-injection type engine.

What is claimed is:

1. A control apparatus of an automatic transmission having a torque converter for controlling by oil pressure at least one clutch of the automatic transmission which is connected to an engine output to be engaged or disengaged to perform gear shifting, comprising:

engine torque calculating means for calculating an output torque of said engine on a basis of a parameter representing a load of said engine and an engine speed;

transfer torque calculating means for calculating a transfer torque necessary for said clutch from parameters associated with at least said calculated engine output torque and engine speed; and command value calculating means for determining a command value relative to an oil pressure acted on said clutch on a basis of said calculated transfer torque;

wherein said oil pressure command value calculating means, when a change of said engine output torque is indicated, determines said oil pressure command value faster than a change of a ratio between an input and output shaft speed of said torque converter.

2. A control apparatus according to claim 1, wherein said transfer torque calculating means includes:

means for calculating a torque ratio of said torque converter on the basis of said engine speed and the output shaft speed of said torque converter;

turbine torque calculating means for calculating an output shaft torque of said torque converter on a basis of said engine output torque and said torque ratio; and means for calculating said transfer torque necessary for said clutch from at least said output shaft torque and output shaft speed of said torque converter.

3. A control apparatus according to claim 1, wherein said engine torque calculating means has means for storing a value of an intake air flow of said engine as a parameter representing a load of said engine, and a data map of engine torque with respect to engine speed and intake air flow.

4. A control apparatus of vehicle having the control apparatus of the automatic transmission according to claim 1, further comprising a load detector for detecting a parameter representing a load of said engine, and rotation detecting means for detecting said engine speed, said parameter representative of said load being at least one of an air intake, a throttle opening angle, a fuel injection time and an amount of fuel injection of said engine.

5. A control apparatus of vehicle according to claim 4, wherein said parameter representative of said load is at least one of the intake air flow, throttle opening angle, fuel injection time and amount of fuel injection of said engine or a combination thereof.

6. A control apparatus of an automatic transmission having a torque converter for controlling by oil pressure at least one clutch of the automatic transmission which is connected to an engine output to be engaged or disengaged to perform gear shifting comprising:

engine torque calculating means for calculating an output torque of said engine on a basis of a parameter representing a load of said engine and an engine speed;

transfer torque calculating means for calculating a transfer torque necessary for said clutch from parameters associated with at least said calculated engine output torque and engine speed;

command value calculating means for determining a command value relative to an oil pressure acted on said clutch on a basis of said calculated transfer torque;

means for calculating a pump capacity coefficient of said torque converter on a basis of said engine speed and an output shaft speed of said torque converter;

means for calculating a second engine output torque on a basis of said pump capacity coefficient and said engine speed;

means for generating a gear shifting start signal to said automatic transmission; and means for correcting said engine output torque produced from said engine torque calculating means by a difference between said engine output torque from said engine torque calculating means and said second engine output torque during a period from the generation of said gear shifting start signal to an actual shifting operation.

7. A control apparatus of an automatic transmission having a torque converter for controlling by oil pressure at least one clutch of the automatic transmission connected to an engine output to be engaged or disengaged to perform gear shifting, comprising:

engine torque calculating means for calculating an output torque of said engine on a basis of a parameter representing a load of said engine and an engine speed;

transfer torque calculating means for calculating a transfer torque necessary for said clutch from parameters associated with at least said calculated engine output torque and engine speed;

command value calculating means for determining a command value relative to an oil pressure acted on said clutch on a basis of said calculated transfer torque;

means for calculating a torque ratio of said torque converter on the basis of said engine speed and the output shaft speed of said torque converter;

turbine torque calculating means for calculating an output shaft torque of said torque converter on a basis of said engine output torque and said torque ratio; and means for calculating said transfer torque necessary for said clutch from at least said output shaft torque and output shaft speed of said torque converter;

means for calculating a pump capacitance coefficient of said torque converter by use of said engine speed and said output shaft speed of said torque converter;

means for calculating a second output shaft torque of said torque converter on a basis of said torque ratio, said pump capacity coefficient and said engine speed;

means for generating a gear shifting start signal to said automatic transmission; and means for correcting said output shaft torque from said turbine torque calculating means by a difference between said output shaft torque from said turbine torque calculating means and said second output shaft torque during a period from the generation of said shifting start signal to an actual shifting operation.

8. A control apparatus according to claim 7, further comprising:

means for obtaining information associated with an operation of an accelerator pedal of a car having said automatic transmission; and means for allowing said turbine torque correcting means to correct when said information associated with the operation of said accelerator pedal meets a predetermined condition.

9. A control apparatus according to claim 8, wherein said means for obtaining said information associated with the operation of said accelerator pedal includes means for storing a signal indicative of an amount of depression of said accelerator pedal, and calculating a rate of change of said amount of depression per unit time, and said correction allowing means allows said correction processing when said rate of change is smaller than a predetermined reference value.

10. A control apparatus of an automatic transmission for controlling by oil pressure at least one clutch of the automatic transmission which is connected to an engine output to be engaged or disengaged to perform gear shifting, comprising:

engine torque calculating means for calculating an output torque of said engine on a basis of a parameter representing a load of said engine and an engine speed;

transfer torque calculating means for calculating a transfer torque necessary for said clutch from parameters associated with at least said calculated engine output torque and engine speed;

command value calculating means for determining a command value relative to an oil pressure acted on said clutch on a basis of said calculated transfer torque;

a data map of the oil pressure command value with respect to said transfer torque, said data map having an oil pressure value changed with a value of friction coefficient of said clutch.

11. A control apparatus of automatic transmission for controlling by oil pressure at least one clutch of an automatic transmission with a torque converter connected to an engine output to be engaged or disengaged to make gear shifting, comprising:

means for capturing a signal of said engine speed;

means for capturing a signal of parameter representative of a load of said engine;

means for capturing a signal of output shaft speed of said torque converter;

means for calculating a speed ratio between the input and output shafts of said torque converter on the basis of said engine speed and said output shaft speed of said torque converter; and command value calculating means for changing a command value of oil pressure acted on said clutch by the parameter representative of a load of said engine and said engine speed, wherein when said parameter representative of a load of said engine is changed, the oil pressure command value calculated according to the order to change the output torque of said engine is changed faster than changing of said speed ratio.

12. A control apparatus of automatic transmission for controlling by oil pressure at least one clutch of an automatic transmission connected to an engine output to be engaged or disengaged to make gear shifting, comprising:

means for capturing a signal of engine speed;

means for capturing a signal of parameter representative of a load of said engine;

means for capturing a signal of output shaft speed of said automatic transmission;

means for calculating a speed ratio between the input and output shafts of said automatic transmission on the basis of said engine speed and said output shaft speed of said automatic transmission; and command value calculating means for changing a command value of oil pressure acted on said clutch by the parameter representative of a load of said engine and said engine speed, wherein when said parameter representative of a load of said engine is changed, the oil pressure command value calculated according to the order to change the output torque of said engine is changed faster than said speed ratio is.

13. An automatic transmission control method for controlling by an oil pressure at least one clutch of an automatic transmission having a torque converter coupled with an engine output to be engaged or disengaged to perform gear shifting, comprising the steps of:

calculating an output torque of said engine on a basis of a parameter representative of a load of said engine and an engine speed;

calculating a transfer torque necessary for said clutch by use of parameters of at least said calculated engine output torque and said engine speed; and determining a command value of oil pressure acted on said clutch according to said calculated transfer torque wherein when the change of the output torque of said engine is indicated, said oil pressure command value is determined faster than is a ratio between an input and output shaft speed of said torque converter.

14. A control method according to claim 13, wherein when said automatic transmission has a torque converter connected to an output shaft of said engine, said transfer torque calculating step includes:

a step of calculating a torque ratio of said torque converter on a basis of said engine speed and an output shaft speed of said torque converter;

a step for calculating an output shaft torque of said torque converter on a basis of the output torque of said engine and said torque ratio; and a step for calculating a transfer torque necessary for said clutch by use of at least said output shaft torque and output shaft speed of said torque converter.

15. A control method according to claim 13, in further comprising the steps of:

detecting an engine speed;

storing an intake air flow of said engine as a parameter representative of a load of said engine; and determining said engine output torque by referring to a data map that shows the engine output torque with respect to said engine speed and said intake air flow.

16. A control method according to claim 13, further comprising the steps of:

detecting a parameter representative of a load of said engine; and detecting said engine speed; said parameter representative of said load being at least one of said intake air flow, throttle opening angle, fuel injection time, and amount of fuel injection of said engine.

* * * * *